(12) United States Patent
Greggs

(10) Patent No.: US 11,040,741 B2
(45) Date of Patent: Jun. 22, 2021

(54) VEHICLE BODY STRUCTURE

(71) Applicant: Nissan North America, Inc., Franklin, TN (US)

(72) Inventor: Alan Greggs, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 42 days.

(21) Appl. No.: 16/669,078

(22) Filed: Oct. 30, 2019

(65) Prior Publication Data

US 2021/0129913 A1    May 6, 2021

(51) Int. Cl.
*B62D 25/04* (2006.01)
*B62D 25/02* (2006.01)

(52) U.S. Cl.
CPC ............. *B62D 25/04* (2013.01); *B62D 25/02* (2013.01)

(58) Field of Classification Search
CPC ................................ B62D 25/04; B62D 25/02
See application file for complete search history.

(56) References Cited

U.S. PATENT DOCUMENTS

| | | | |
|---|---|---|---|
| 3,591,231 A * | 7/1971 | Wessells ................. | B62D 25/02 296/193.05 |
| 4,917,435 A | 4/1990 | Bonnett et al. | |
| 5,230,530 A * | 7/1993 | Iriyama ................. | B60R 21/205 280/732 |
| 5,586,799 A * | 12/1996 | Kanemitsu ........... | B62D 25/147 296/203.02 |
| 6,827,390 B2 * | 12/2004 | Zummallen ............ | B62D 25/04 296/146.11 |
| 7,472,948 B2 * | 1/2009 | Yatabe ................... | B62D 25/02 296/203.01 |
| 7,510,234 B2 | 3/2009 | Ameloot et al. | |
| 7,543,882 B2 | 6/2009 | Day et al. | |
| 7,959,217 B2 * | 6/2011 | Onuma ................... | B62D 25/04 296/187.12 |
| 9,045,166 B2 | 6/2015 | Fellague | |
| 9,580,111 B1 | 2/2017 | Caliskan et al. | |
| 9,630,651 B1 | 4/2017 | Baccouche et al. | |
| 2006/0208537 A1 * | 9/2006 | Dingman ............... | B62D 25/04 296/193.05 |
| 2012/0313400 A1 | 12/2012 | Balzer et al. | |

(Continued)

FOREIGN PATENT DOCUMENTS

WO    2011151962 A1    12/2011

*Primary Examiner* — Pinel E Romain
(74) *Attorney, Agent, or Firm* — Global IP Counselors, LLP

(57) ABSTRACT

A vehicle body structure includes a rear pillar assembly, an attachment panel and a reinforcement panel. The rear pillar assembly has an upper end, a lower end and a mid-section and partially defines a rear corner area of a passenger compartment. The rear pillar assembly includes an inner panel that has a first upright edge that at least partially defines one side of a rear window opening and a second upright edge that at least partially defines a door opening. The attachment panel is fixedly attached to the inner panel along the mid-section of the rear pillar assembly. The reinforcement panel overlays the inner panel and the attachment panel and has a curved portion that extends from the attachment panel along the inner panel and curves downward along the inner panel. The curved portion is welded to the mid-section of the inner panel.

18 Claims, 12 Drawing Sheets

(56) References Cited

U.S. PATENT DOCUMENTS

| | | | | |
|---|---|---|---|---|
| 2017/0233009 A1* | 8/2017 | Miranda | ............... | B60R 22/24 |
| | | | | 296/193.05 |
| 2018/0044956 A1* | 2/2018 | Gerhardt | ............... | E05D 15/32 |
| 2018/0265027 A1* | 9/2018 | Nusier | ................. | B60R 21/16 |
| 2019/0168813 A1* | 6/2019 | Nakamoto | .......... | B62D 29/007 |
| 2020/0189662 A1* | 6/2020 | Aguirre Miranda | ........................ | |
| | | | | B62D 27/023 |
| 2020/0269930 A1* | 8/2020 | Kiyoshita | ............ | B62D 25/087 |
| 2020/0398903 A1* | 12/2020 | Greggs | ................ | B62D 25/04 |

* cited by examiner

VEHICLE BODY STRUCTURE

BACKGROUND

Field of the Invention

The present invention generally relates to a vehicle body structure. More specifically, the present invention relates to a vehicle body structure having a reinforcement panel installed to a mid-section of a rear pillar assembly adding rigidity and resistance to deformation in the absence of a B-pillar.

Background Information

Most vehicles with four doors (two doors on each side of the vehicle) include an A-pillar, a B-pillar and a C-pillar (a rear pillar), in which the B-pillar is located between the two doors (front and rear doors). There are some vehicle designs, such as king cab pickup truck designs, that have no B-pillar. The absence of a B-pillar allows the design of the vehicle have a door opening that is maximized, thereby improving ease and effectiveness for entering and exiting the passenger compartment of the vehicle.

SUMMARY

One object of the present disclosure is to provide a vehicle with a reinforced rear pillar structure in the absence of a B-pillar between front and rear doors of a vehicle body structure.

In view of the state of the known technology, one aspect of the present disclosure is to provide a vehicle body structure with a rear pillar assembly that has an upper end, a lower end and a mid-section. The rear pillar structure at least partially defines a rear corner area of a passenger compartment. The rear pillar assembly includes an inner panel, an attachment panel and a reinforcement panel. The inner panel has a first upright edge that at least partially defines one side of a rear window opening and a second upright edge that at least partially defines a door opening. The attachment panel is fixedly attached to the inner panel along the mid-section of the rear pillar assembly. An upper edge of the attachment panel at least partially defines a lower portion of the rear window opening. The reinforcement panel overlays the mid-section of the inner panel and a portion of the attachment panel. The reinforcement panel further has a curved portion that extends in a vehicle forward direction from the attachment panel along the inner panel and further curves downward along the inner panel. The curved portion is welded to the mid-section of the inner panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
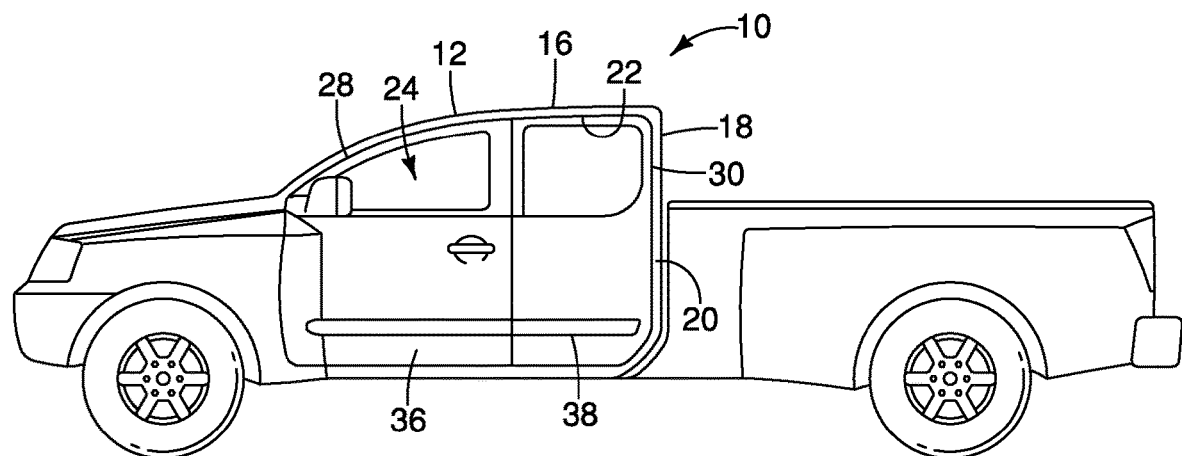
FIG. 1 is a side view of a vehicle that has vehicle body structure with a side structure that defines a door opening having a front door and a rear door in respective closed orientations in accordance with a first embodiment.
Figure 2:
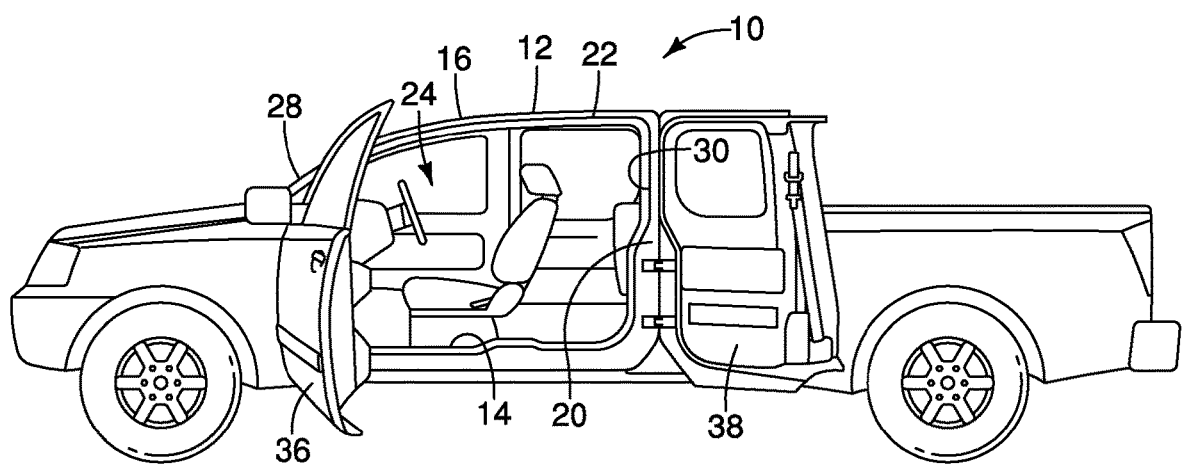
FIG. 2 is another side view of the vehicle showing the front and rear doors in respective open orientations, the front door being hinged at a front end thereof, and, the rear door being hinged at a rear end there of such that when the rear door is closed, a front edge of the rear door serves as a B-pillar with respect to providing a location for the front door to engage a latching mechanisms on the rear door, in accordance with the first embodiment.

Referring initially to FIGS. 1 and 2, a vehicle 10 having a vehicle body structure 12 is illustrated in accordance with a first embodiment.

The vehicle body structure 12 includes, among other features, a floor structure 14 (FIG. 2), a roof structure 16, a rear wall structure 18 and side structures 20. The roof structure 16 includes roof rail assemblies 22 that support a roof panel, as described further below. The floor structure 14, the roof structure 16, the rear wall structure 18 and the side structures 20 surround and at least partially define a passenger compartment 24. Additional features of the floor structure 14, the roof structure 16 and the rear wall structure 18 are described below as necessary. Otherwise, the floor structure 14, the roof structure 16 and the rear wall structure 18 are conventional structures whose description is omitted for the sake of brevity.

There are two of the side structures 20, one on the passenger side (not shown) of the vehicle 10 and one on the driver side. The two side structures 20 are symmetrically identical being mirror images of one another. Description of the side structure 20 on the driver side of the vehicle 10 is provided below and applies equally to the passenger side.

The side structure 20 basically includes an A-pillar assembly 28, a rear pillar assembly 30 and at least partially defines the roof rail assembly 22 on the driver side of the vehicle 10. The side structure 10 defines a door opening 34 that is dimensioned to receive a front door 36 and a rear door 38.

As is shown in FIG. 2, there is no B-pillar present in the side structure 20. Rather, the rear door 38 is hinged at a rear end of the opening 34. The rear door 38 includes door latching hardware and structure that serves functionally as a B-pillar with respect to a latch mechanism (not shown) that keeps the front door 36 closed. Hence, the rear pillar assembly 30 is not referred to as a C-pillar but serves structurally as the C-pillar in the overall design of the depicted vehicle 10. As is described below, the rear pillar assembly 30 is reinforced thereby adding strength to the side structure 20.

Figure 3:
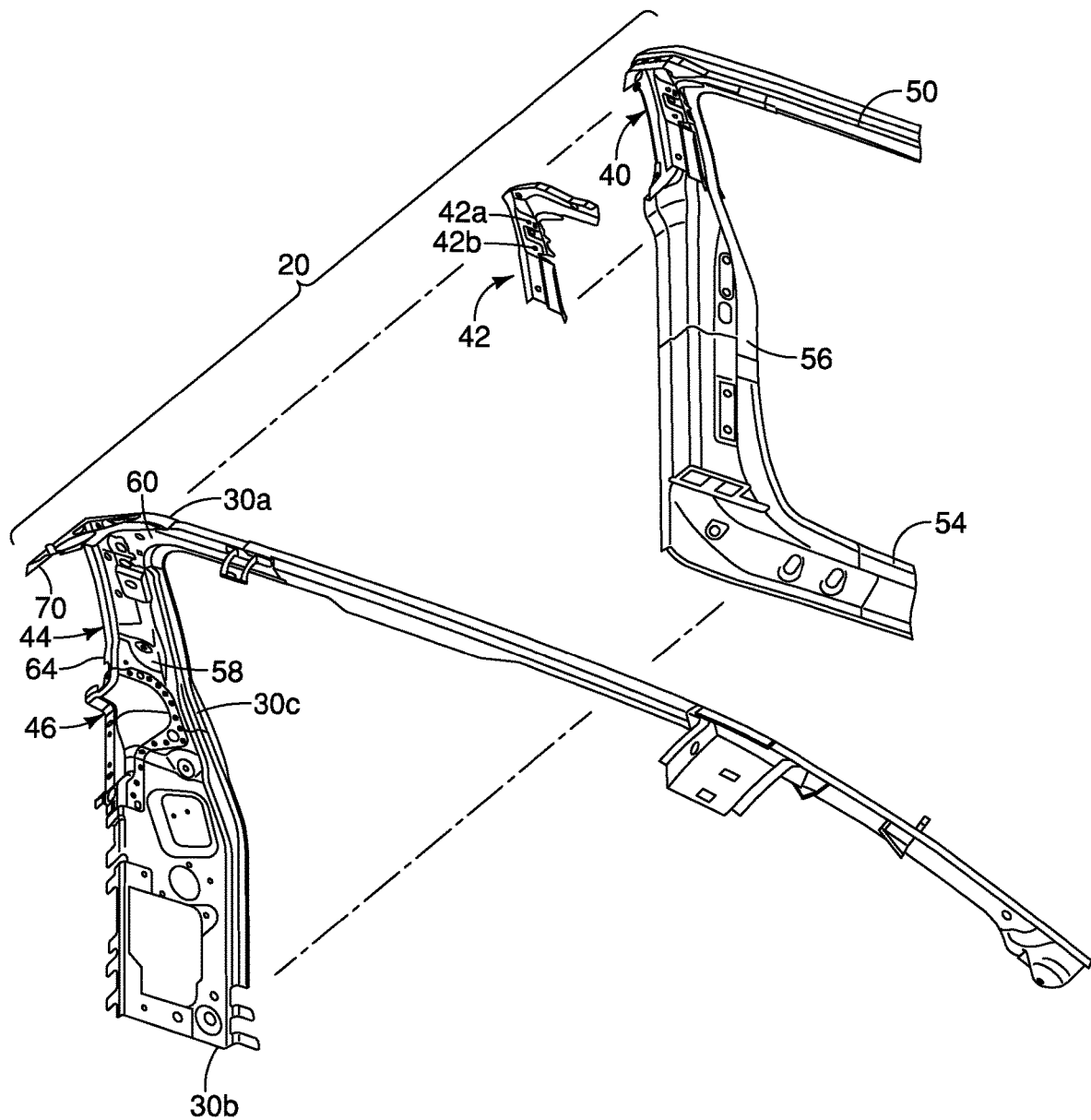
FIG. 3 is an exploded perspective view showing portions of an outboard panel assembly and portions of an inboard panel assembly that together define the side structure of the vehicle body structure and further shows an upper reinforcing panel that is sandwiched between the inboard panel assembly and the outboard panel assembly, the upper reinforcing panel located within an upper area of a rear pillar assembly in accordance with the first embodiment.

As shown in an exploded view in FIG. 3, the side structure 20 includes an outboard panel assembly 40 (only a portion thereof being shown), an upper reinforcement panel 42 and an inboard body panel assembly 44 (only a portion thereof being shown) and a mid-reinforcement panel 46, hereinafter referred to as the reinforcement panel 46. The roof rail assembly 22 and the rear pillar assembly 30 are also defined by respective sections of the side structure 20. The roof rail assembly 22 defines an upper edge of the door opening 34 and the rear pillar assembly 30 defines a rear edge of the door opening 34.

Figure 5:
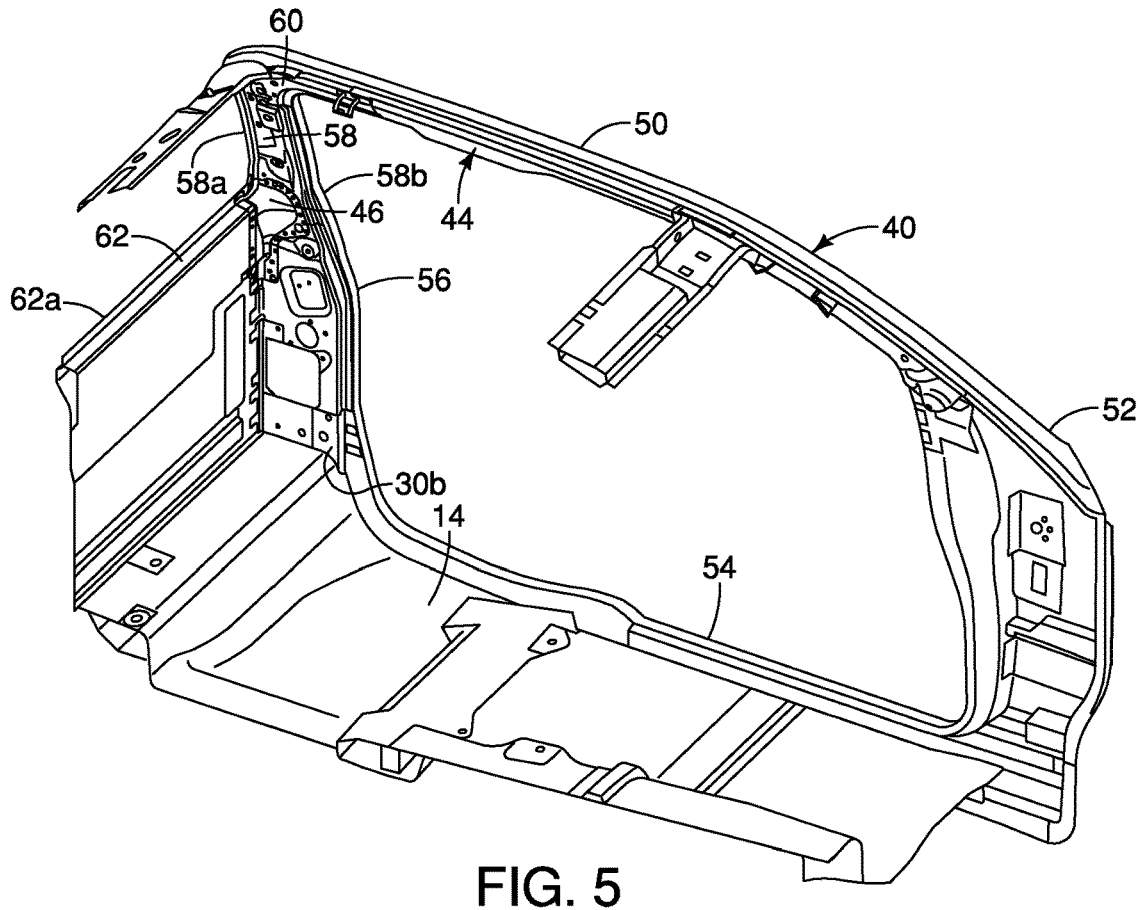
FIG. 5 is a perspective view of the side structure of the vehicle body structure showing various features of the side structure including a first panel (also referred to as an inner panel) and a second panel of the rear pillar structure and a reinforcement panel installed to a mid-section of the rear pillar structure in accordance with the first embodiment.
Figure 6:
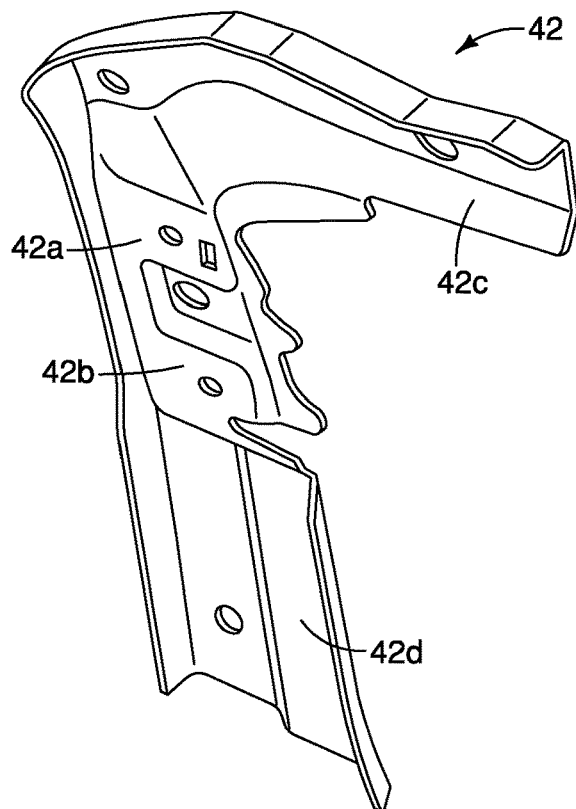
FIG. 6 is a perspective view of the upper reinforcing panel show removed from the side structure showing seatbelt reinforcing areas in accordance with the first embodiment.
Figure 7:
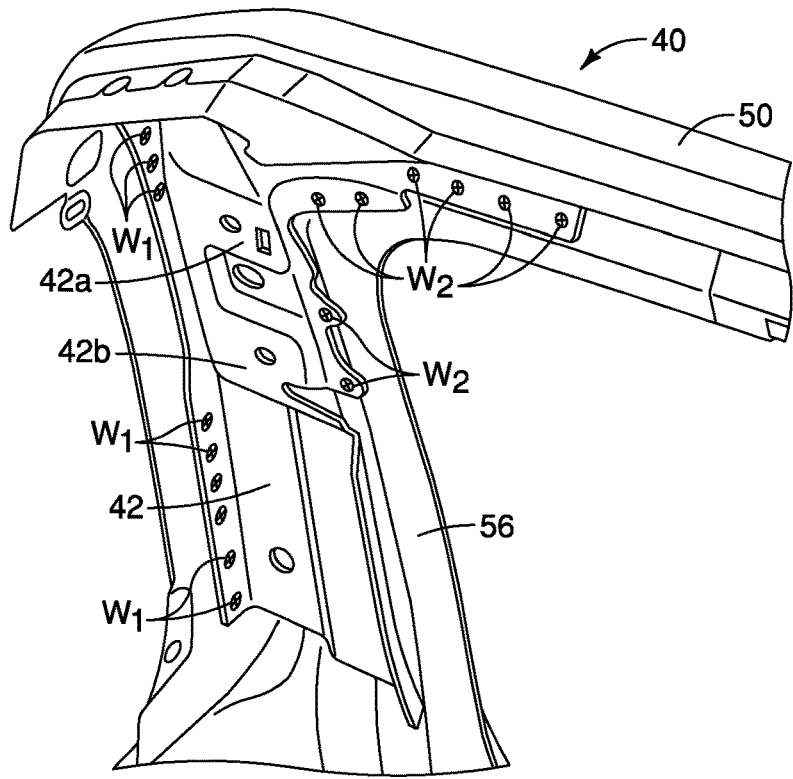
FIG. 7 is another perspective view showing an upper rear portion of the outboard panel assembly with the upper reinforcement panel installed and welded thereto in accordance with the first embodiment.
Figure 8:
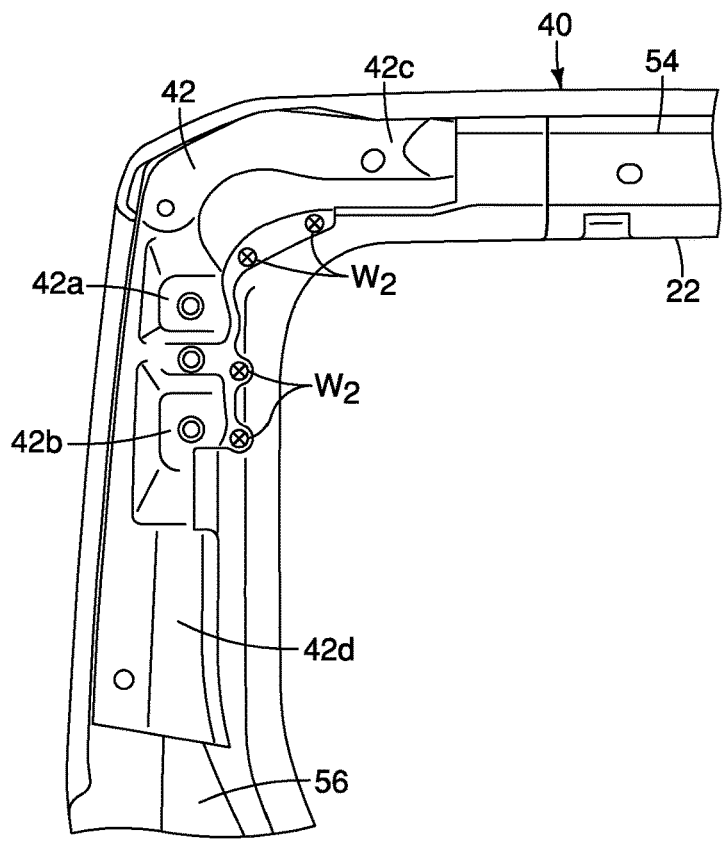
FIG. 8 is a side view showing the upper rear portion of the outboard panel assembly depicted in FIG. 7 showing the upper reinforcement panel installed and welded to the outboard panel assembly in accordance with the first embodiment.

The outboard panel assembly 40 is typically formed from a plurality of panels welded together to form the overall shape. As shown in FIGS. 3 and 5, corresponding portions of the outboard panel assembly 40 define a roof rail section 50, an A-pillar section 52, a sill section 54 and a rear pillar section 56. Alternatively, the outer panel assembly 40 can be formed from a single panel, shaped to define the roof rail section 50, the A-pillar section 52, the sill section 54 and the rear pillar section 56. The outer pillar assembly 40 is typically provided with a smooth finish and is painted, defining a portion of the exterior of the vehicle 10.

As shown in FIGS. 3 and 6-8, the upper reinforcement panel 42 includes first and second seatbelt reinforcing areas 42a and 42b. The upper reinforcement panel 42 is welded at weld locations $W_1$ and $W_2$ to the outboard panel assembly 40. The first and second seatbelt reinforcing areas 42a and 42b align with corresponding areas of the inboard body panel assembly 44 at an upper end of the rear pillar assembly 30 where a seatbelt (not shown) attaches to the rear pillar assembly 30. Overall, the upper reinforcement panel 42 has an inverted L-shape such that an upper portion 42c extends along a rear section of the roof rail section 50 and a lower portion 42d extends downward from the upper section 42c along the rear pillar section 56. The first and second seatbelt reinforcing areas 42a and 42b are formed within the lower portion 42d.

A description of the inboard body panel assembly 44 is now provided, in particular, description is provided for portions of the inboard body panel assembly 44 that define the rear pillar assembly 30 and a rearward portion of the roof rail assembly 22.

The inboard body panel assembly 44 is fixedly attached to the outboard panel assembly 40 (also referred to as the outboard body panel assembly) by, for example, welding techniques (not shown). The rear corner area of the outboard panel assembly 40 and the inboard body panel assembly 44 define the rear pillar assembly 30 and further defines a rear corner of the passenger compartment 24.

As shown in FIGS. 4-5 and 9-10, the rear pillar assembly 30 has an upper end 30a, a lower end 30b and a mid-section 30c. The upper end 30a is attached to the roof structure 16, and, the lower end 30b is attached to the floor structure 14. The portions of the inboard body panel assembly 44 that at least partially define the rear pillar structure 30 include a first panel 58 (also referred to as an inner panel 58), a second panel 60, an attachment panel 62 and the reinforcement panel 46.

Figure 4:
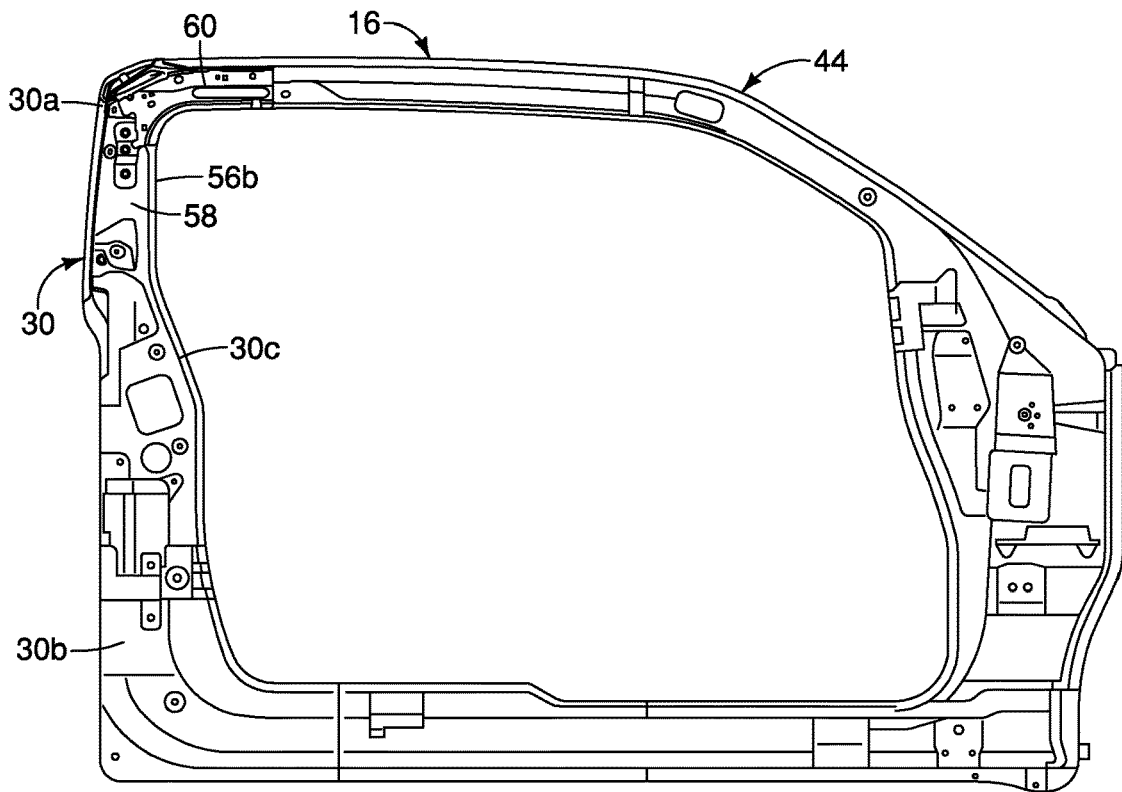
FIG. 4 is an inboard side view of the side structure of the vehicle body structure shown removed from other parts of the vehicle body structure in accordance with the first embodiment.
Figure 9:
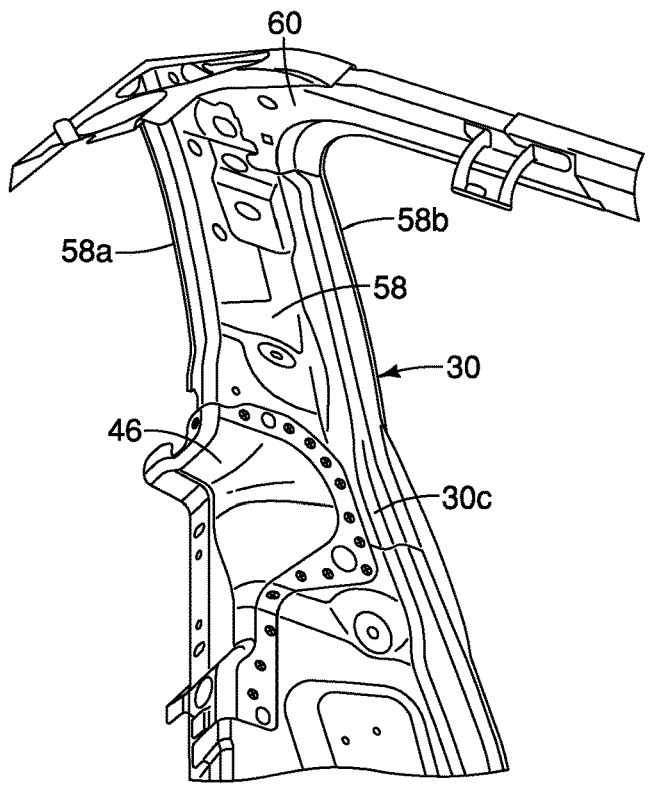
FIG. 9 is a perspective view of an upper rear portion of the side structure showing the inboard panel assembly welded to the outboard panel assembly concealing the upper reinforcement panel there between and further showing a first panel and a second panel that at least partially define the rear pillar assembly and showing the reinforcement panel welded to the mid-section of the rear pillar assembly in accordance with the first embodiment.
Figure 10:
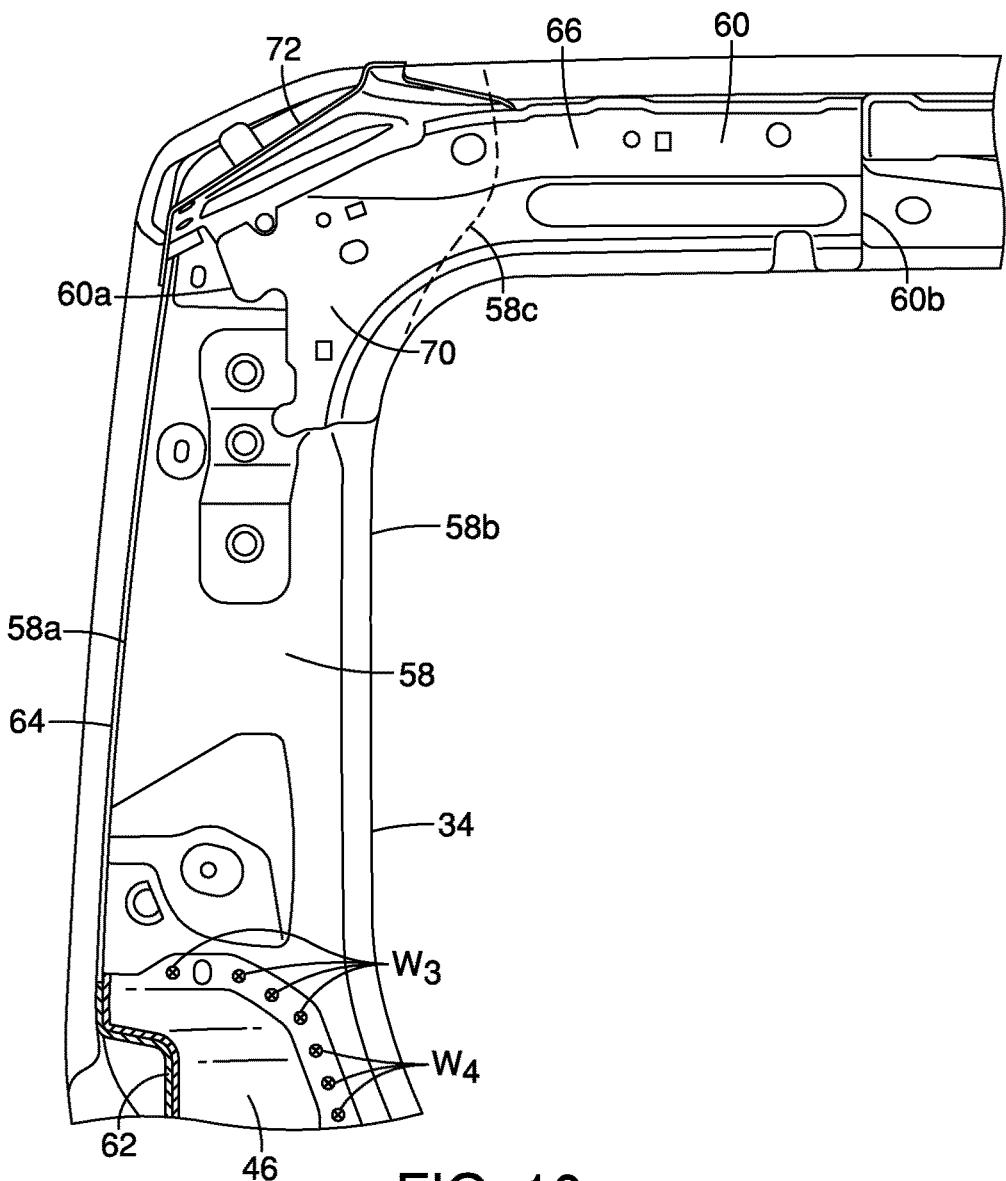
FIG. 10 is a side view of the side structure showing the first panel and the second panel of the inboard panel assembly along with the reinforcement panel welded to the mid-section of the first panel in accordance with the first embodiment.
Figure 11:
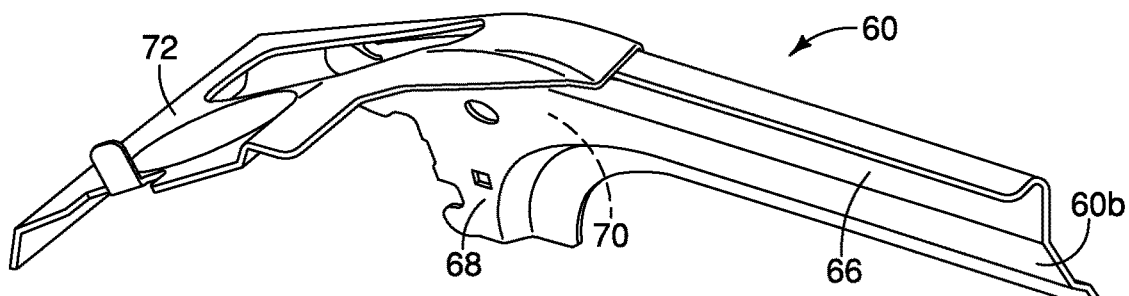
FIG. 11 is a perspective view of the second panel removed from the inboard panel assembly showing a roof rail section, a pillar section, an overlap area and a roof rail attachment panel in accordance with the first embodiment.
Figure 12:
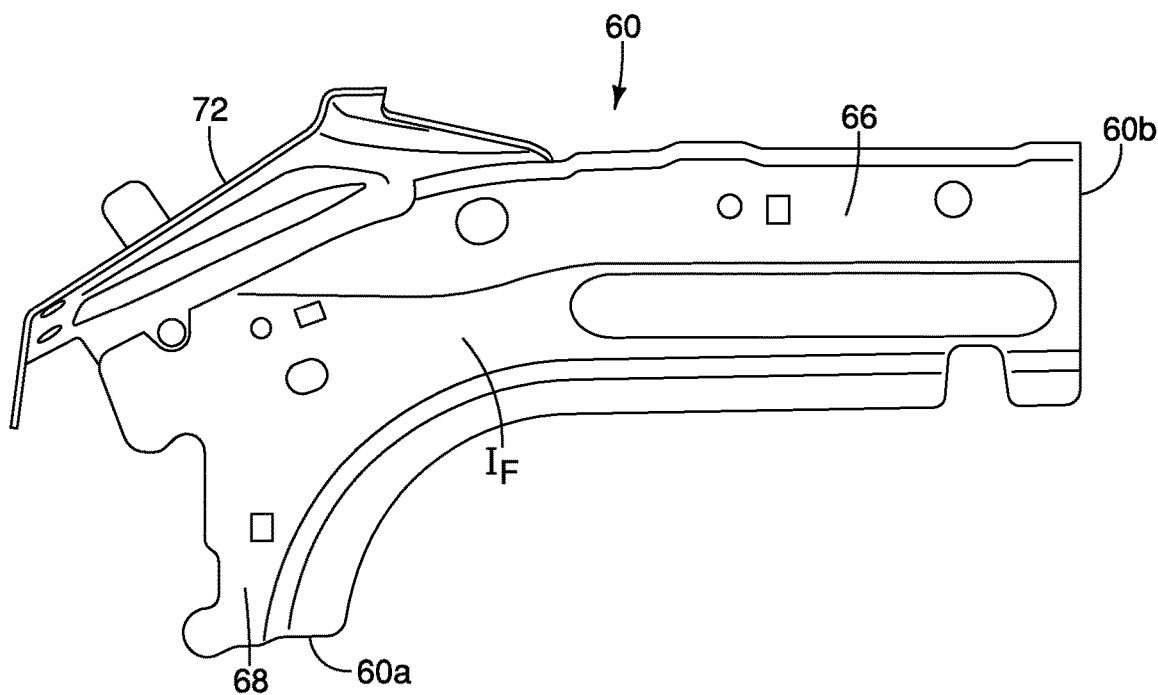
FIG. 12 is a side view of the second panel removed from the inboard panel assembly showing an inboard surface of the pillar section and the roof rail attachment panel in accordance with the first embodiment.
Figure 13:
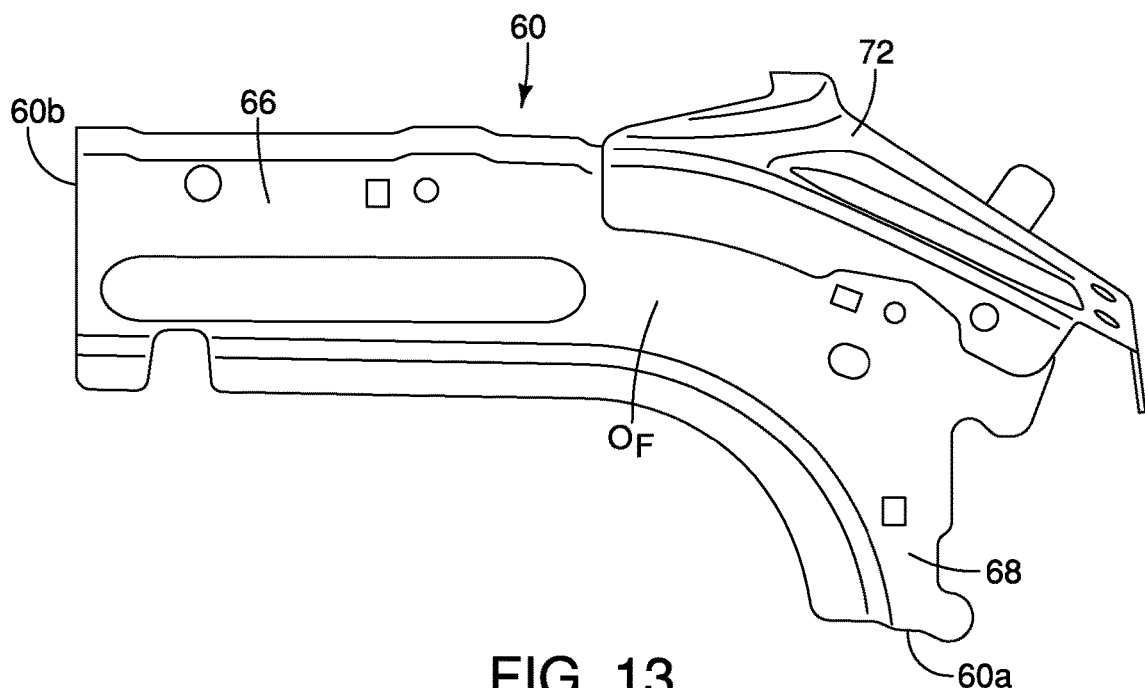
FIG. 13 is another side view of the second panel removed from the inboard panel assembly showing an outboard surface of the pillar section and the roof rail attachment panel in accordance with the first embodiment.
Figure 14:
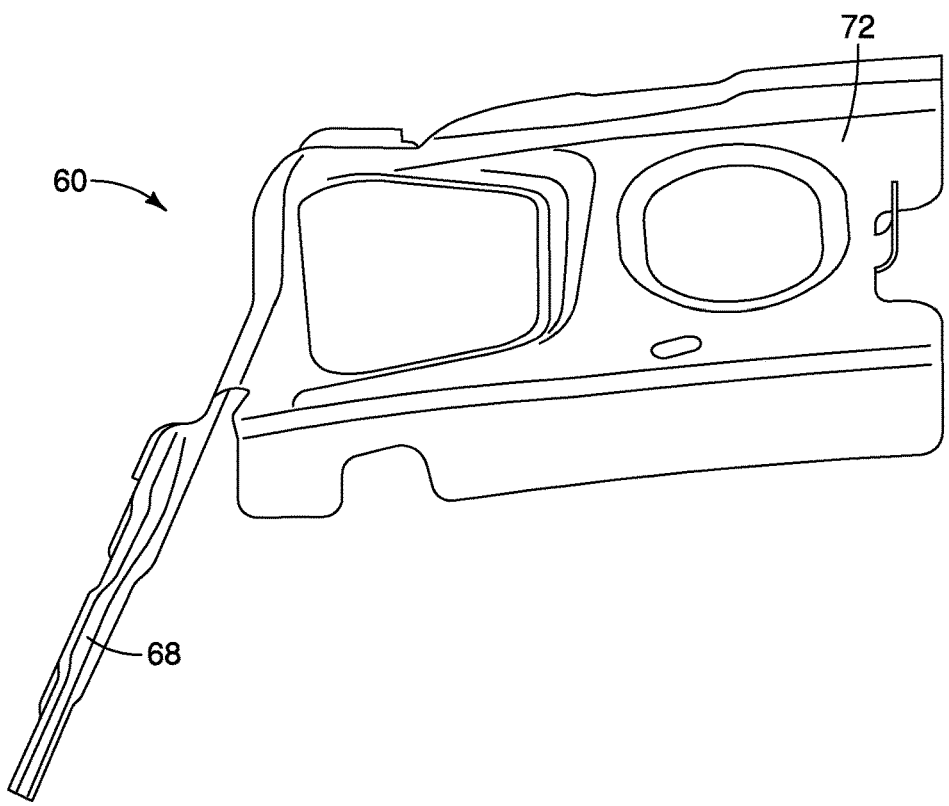
FIG. 14 is a rear view of the second panel removed from the inboard panel assembly in accordance with the first embodiment.
Figure 15:
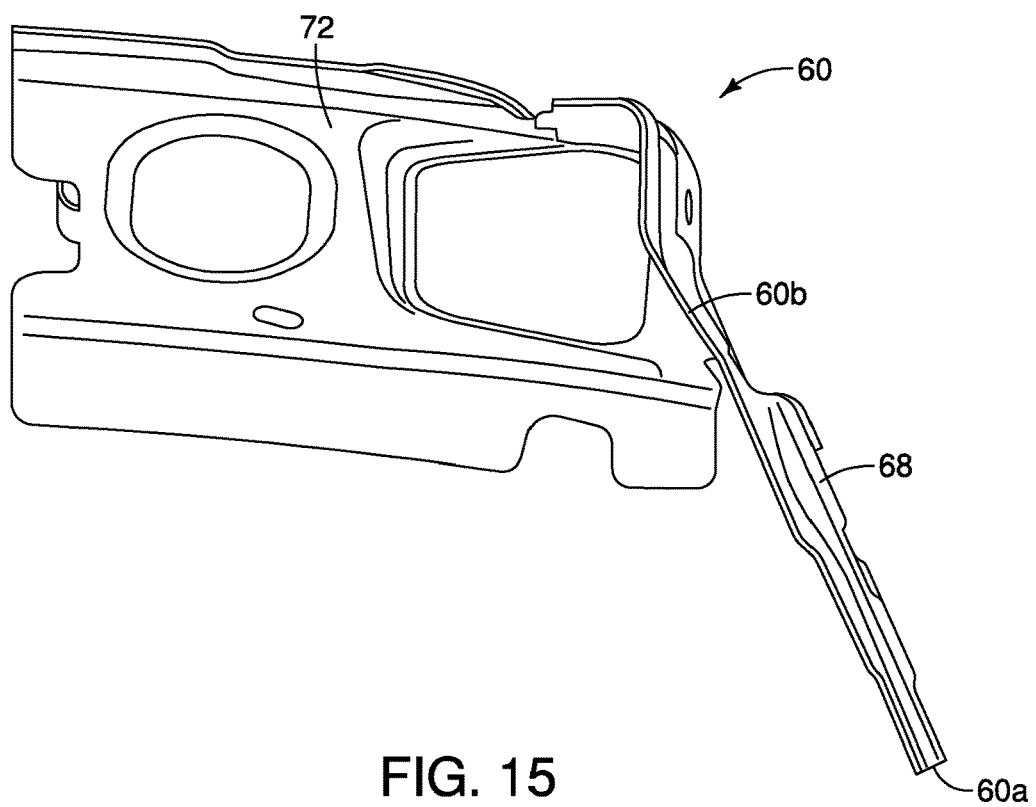
FIG. 15 is a front view of the second panel removed from the inboard panel assembly in accordance with the first embodiment.
Figure 16:
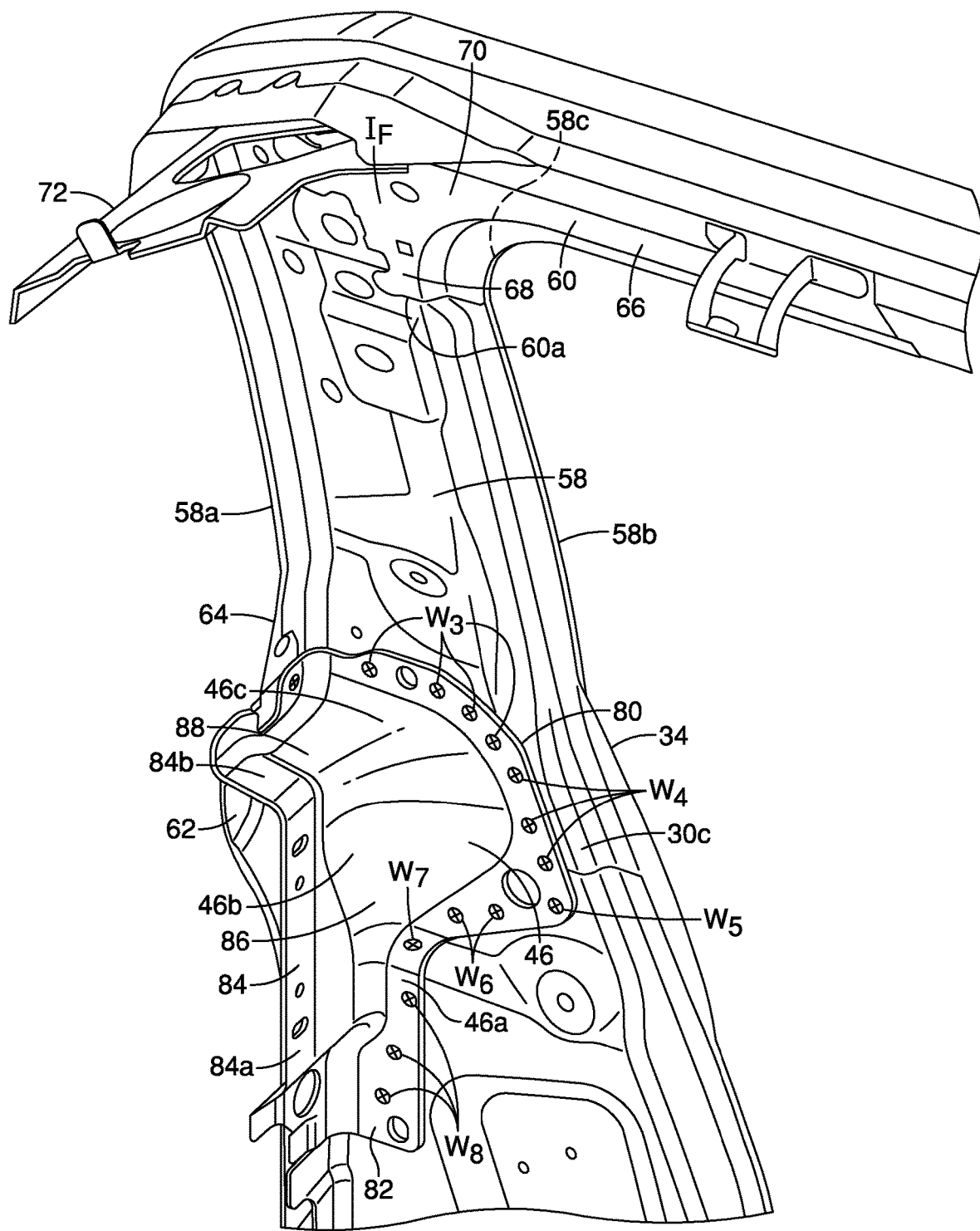
FIG. 16 is a perspective view of an upper rear portion of the side structure with the inboard panel assembly and the outboard panel assembly fixed to one another and showing the first panel and the second panel of the inboard panel assembly and the reinforcement bracket attached to the first panel in accordance with the first embodiment.

As shown in FIGS. 9-10 and 16, the first panel 58 has a first upright edge 58a, a second upright edge 58b and upper forward edge 58c. The first upright edge 58a at least partially defines one side of a rear window opening 64. The second upright edge 58b at least partially defines the door opening 34. The upper forward edge 58c is located along a rearward section of the roof rail assembly 22, as shown in FIG. 10. The upper forward edge 58c defined a forward end of the first panel 58. As shown in FIGS. 4 and 5, the first panel 58 extends downward from the upper end 30a to the floor structure 14.

As shown in FIGS. 4-5 and 9-10, the second panel 60 extends from the upper end 30a in a vehicle forward direction and at least partially defining the roof rail assembly 22. The second panel 60 includes a roof rail section 66 and a pillar section 68. The roof rail section 66 extends from the upper end 30a in a vehicle forward direction at least partially defining the roof rail assembly 22. The pillar section 68 extends downward from the roof rail section 66 and at least partially defines the rear pillar structure 30.

The first panel 58 and the second panel 60 overlapping one another at the upper end 30a of the rear pillar assembly 30 defining an overlap area 70. The first and second panels 58 and 60 are fixedly attached to one another at the overlap area 70 by a series of welds (not shown). The first panel 58 and the second panel 60 overlay at least a portion of an inboard surface of the upper reinforcement panel 42, such that the reinforcement panel is concealed between the outboard panel assembly 40 and the inboard body panel assembly 44.

The second panel 60 includes a roof rail attachment panel 72 that is fixedly attached via, for example, welding techniques, to a rear roof rail assembly 22a that extends above the rear window opening 64, as shown in FIG. 5.

The second panel 60 is further depicted in FIGS. 11-15 removed from the inboard body panel assembly 44. The roof rail attachment panel 72 generally extends in a vehicle inboard direction from the roof rail section 66 of the second panel 60. The roof rail section 66 of the second panel 60 extend in a vehicle longitudinal direction with the roof rail attachment panel 72 extending in a direction that is angularly offset from the roof rail section 66 and the pillar section 68 of the second panel 60.

The first and second panels 58 and 60 are dimensioned to provide rigidity and resistance to deformation of the rear pillar structure 30 in response to forces acting downward against the upper end 30a of the rear pillar structure 30, in particular in the absence of a B-pillar. Specifically, the first panel 58 has a first thickness that is, for example, between 1.5 mm and 2.0 mm. The second panel 60 has a second thickness that is, for example, between 1.8 and 2.5 mm. Preferably, the second thickness (of the second panel 60) is greater than the first thickness (the first panel 58). In the depicted embodiment, the first thickness is 1.6 mm and the second thickness is 1.8 mm. Consequently, the second thickness is at least 10% greater than the first thickness.

The overlap area 70 is defined by the overlapping of the first panel 58 and the second panel 60 and includes at least 35% of an outboard facing surface $O_F$ of the second panel 60 overlapping a portion of an inboard facing surface $I_F$ of the first panel 58. Preferably, the overlap area 70 includes at least 10% of the inboard facing surface $I_F$ of the first panel 58 overlapping the outboard facing surface $O_F$ of the second panel 60.

Further, the first panel 58 extends downward from the upper end 30a of the rear pillar assembly 30 a distance that is at least 80% of the overall height of the rear pillar assembly 30.

The attachment panel 62 is fixedly attached to the first panel 58 (also referred to as the inner panel 58) along the mid-section 30c of the rear pillar assembly 30. As shown in FIG. 5, an upper edge 62a of the attachment panel 62 at least partially defines a lower portion of the rear window opening 64.

A description of the reinforcement panel 46 is now provided with specific reference to FIGS. 3, 5, 9-10 and 16-17. The reinforcement panel 46 overlays the mid-section 30c of the first panel 58 (the inner panel 58) and a portion of the attachment panel 62, as shown in FIG. 10. The reinforcement panel 46 further has a curved portion 80 that extends in a vehicle forward direction away from the attachment panel 62 along the first panel 58 (the inner panel). The curved portion 80 further curves downward along the first panel 58. The curved portion 80 is welded to the mid-section 30c of the first panel 58.

Figure 17:
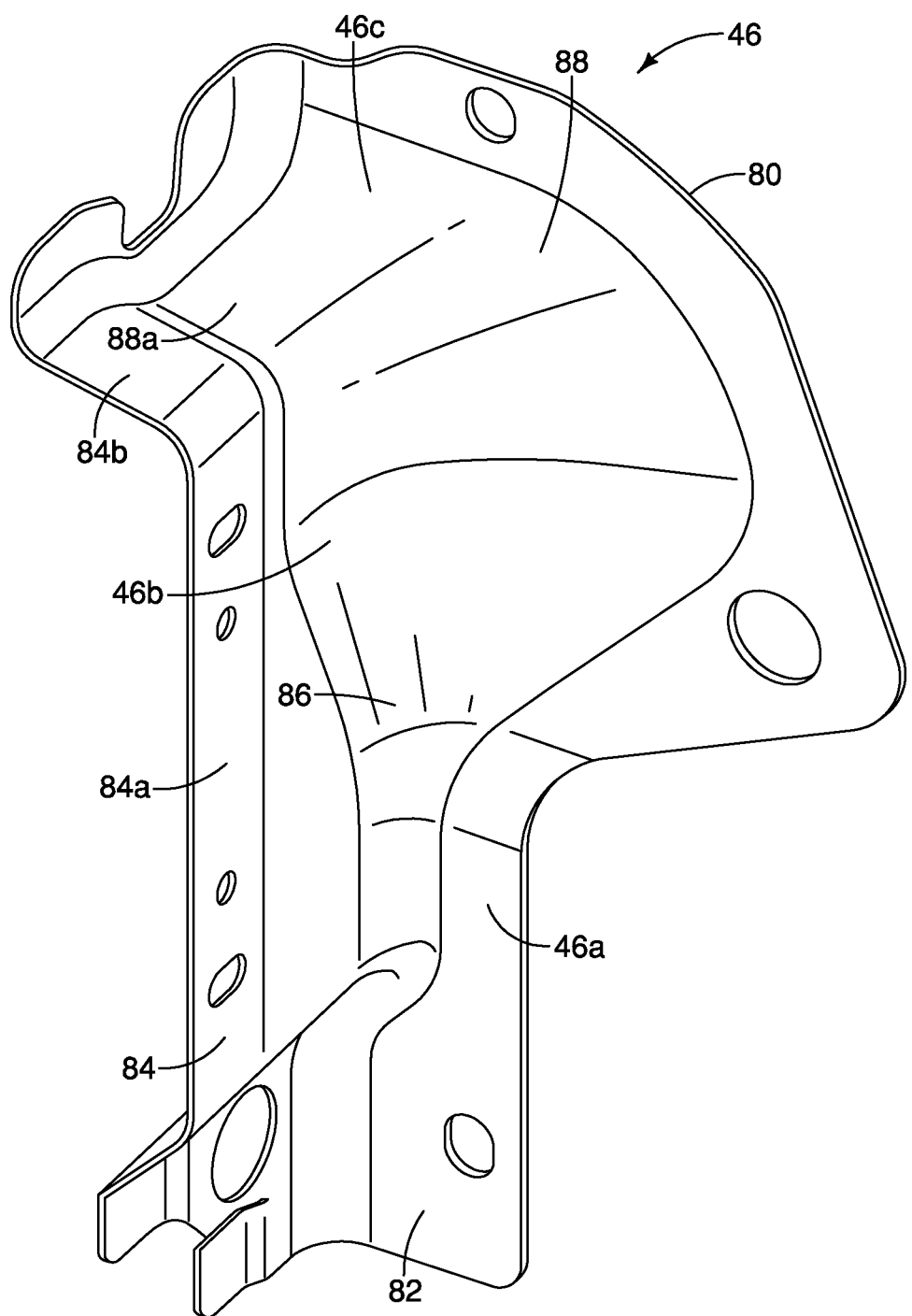
FIG. 17 is a perspective view of the reinforcement bracket shown removed from the side structure in accordance with the first embodiment.

As shown in FIGS. 16 and 17, the reinforcement panel 46 includes a lower section 46a, a mid-section 46b, an upper section 46c and the curved portion 80. The lower section 46a of the reinforcement panel 46 includes a forward portion 82 that covers and is welded to a corresponding portion of the first panel 58, and a rearward portion 84 that overlays a corresponding lower portion of the attachment panel 62. The forward portion 82 and the rearward portion 84 are angularly offset from one another by an angle that is between 75 degrees and 100 degrees. In the depicted embodiment, the forward portion 82 and the rearward portion 84 are angularly offset from one another where the angle is approximately 90 degrees (perpendicular to one another).

The mid-section 46b extends upward from the lower section 46a and has a contoured surface that defines a dimple area 86 with three orthogonal surface sections. Orthogonal Surfaces are families of surfaces which are mutually orthogonal. Up to three families of surfaces may be orthogonal in three dimensions. The simplest example of three orthogonal surfaces in three dimensions are orthogonal planes, but three confocal conic surfaces are also mutually orthogonal.

The upper section 46c extends from a surface section 88 of the mid-section 46b and includes a horizontal surface portion 88a located adjacent to the lower portion of the rear window opening 64. The curved portion 80 extends in a forward vehicle direction from the upper section 46c of the reinforcement panel 46. The curved portion 80 has a curved edge that extends downward along the first panel 58 and defines an upper end of the curved portion 80 and a forward end of the curved portion 80. The upper end of the curved portion 80 is welded to the first panel 58 via welds $W_3$. The forward end of the curved portion 80 is welded to the first panel 58 via welds $W_4$. A forward most area of the curved portion 80 is welded to the first panel 58 via a weld $W_5$.

The lower section 46a of the reinforcement panel 46 curves rearward and is welded to the first panel 58 via welds $W_6$. Each of the welds $W_3$ thru $W_6$ are generally co-planar, or, can be slightly shy of being co-planar in that the area of the first panel 58 corresponding to the welds $W_3$ thru $W_6$ can be planar or slightly curved, depending upon the overall design of the vehicle 10.

However, the area of a weld $W_7$ fixing the reinforcement panel 46 to the first panel 58 is horizontally oriented and approximately perpendicular to the areas of the welds $W_3$ thru $W_6$. Further, the lower welds $W_8$ weld an upright or vertical section of the reinforcement panel 46 to the first panel 58.

The rearward portion 84 of the reinforcement panel 46 has an upright section 84a and a horizontal section 84b that are welded to the attachment panel 62, as shown in FIG. 5. The horizontal section 84b is adjacent to and below the rear window opening 64. As shown in FIGS. 16 and 17, the forward portion 82 below the weld $W_7$ and the upright section 84*a* of the rearward portion 84 are angularly offset from one another by an angle that is between 75 degrees and 100 degrees.

The reinforcement panel 46 is designed to provide rigidity and resistance to deformation of the rear pillar structure 30 in response to forces acting against the vehicle body structure 12, in particular, in the absence of a B-pillar.

In the depicted embodiment, the first panel 58 can be a single panel that extends from the floor structure 14 to the roof structure 16. Alternatively, the first panel 58 can be assembled from two or more panels welded together.

The reinforcement panel 46 has a thickness of 1 mm but can have a thickness of between 1 mm and 2 mm, depending upon the overall vehicle design and structural needs. In the depicted embodiment, the reinforcement panel 46 is a single panel formed into the depicted shape. Alternatively, the reinforcement panel 46 can be made of two different panels, as described below in a second embodiment.

Second Embodiment

Figure 18:
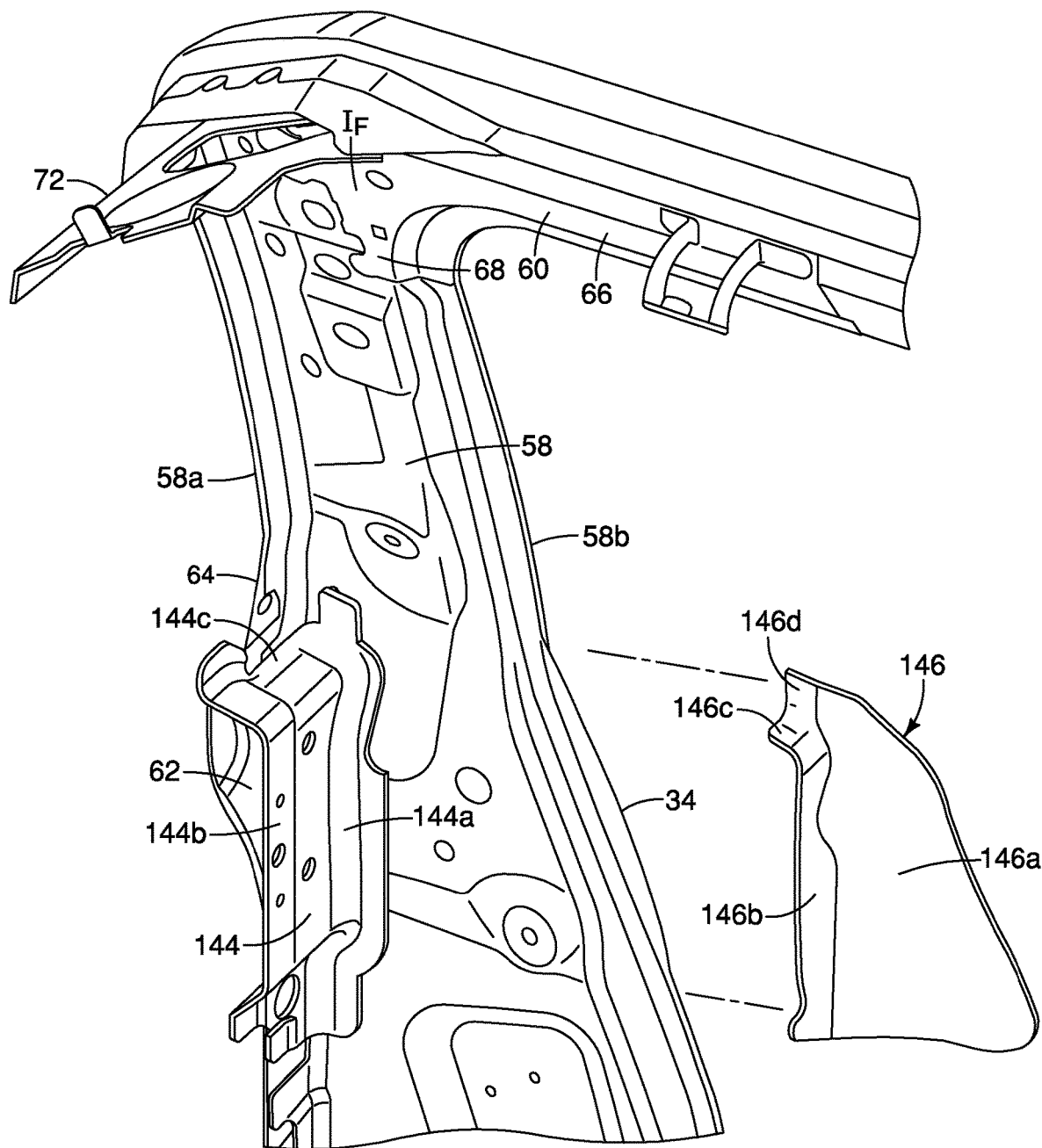
FIG. 18 is an exploded perspective view of the upper rear portion of the side structure with the inboard panel assembly and the outboard panel assembly fixed to one another and showing a first reinforcement bracket and a second reinforcement bracket, the first reinforcement bracket attached to the rear pillar structure and the second reinforcement bracket with an indication of attachment locations of the second reinforcement bracket to each of the first reinforcement bracket and the first panel in accordance with a second embodiment.
Figure 19:
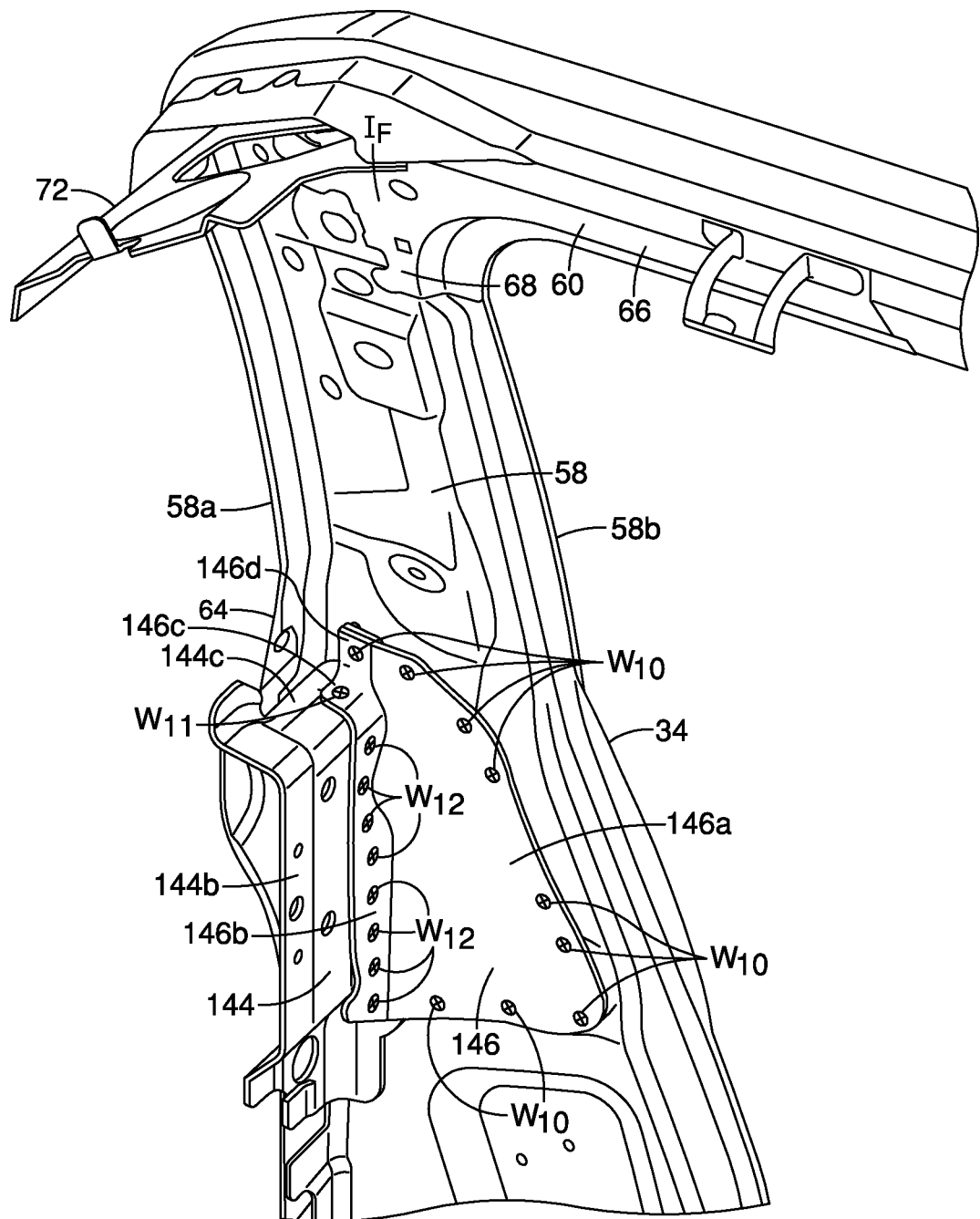
FIG. 19 is a perspective view of the upper rear portion of the side structure similar to FIG. 18 with the second reinforcement bracket attached to the first reinforcement bracket and the first panel in accordance with the second embodiment.

Referring now to FIGS. 18 and 19, a vehicle body structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the vehicle body structure 112 includes the rear pillar structure 30 as described above with respect to the first embodiment. For example, the first panel 58 and the second panel 60 are present in the second embodiment. However, the reinforcement panel 46 has been replaced with a first reinforcement panel 144 and a second reinforcement panel 146 that add rigidity and strength against deformation to the rear pillar structure 30 where the vehicle body structure 112 is designed in the absence of a B-pillar.

In the second embodiment, the first reinforcement panel 144 is welded to the first panel 58 and welded to the attachment panel 62 in an area adjacent to and below a lower corner of the rear window opening 64. The second reinforcement panel 146 has a main section 146*a*, a rear section 146*b*, a horizontal section 146*c* and an upper rear corner 146*d*. The main section 146*a*, the rear section 146*b* and the upper rear corner 146*d* are all approximately vertically oriented sections, with the horizontal section 146*c* being approximately perpendicular to each of the main section 146*a*, the rear section 146*b* and the upper rear corner 146*d*, or, being angularly offset from each.

The main section 146*a* and the upper corner 146*d* of the second reinforcement panel 146 are welded to the first panel 58 by welds $W_{10}$. The horizontal section 146*c* is welded to a horizontal area of the first reinforcement panel 144 via weld $W_{11}$. The rear section 146*b* of the second reinforcement panel 146 is welded to a forward area of the first reinforcement panel 144 via welds $W_{12}$. As with the first embodiment, this arrangement provides additional strength to the rear pillar structure 30 in the absence of a B-pillar.

The vehicle 10 includes many structural elements and devices that are conventional components that are well known in the art. Since such structural elements and devices are well known in the art, these structures and devices will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the with the vehicle body structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising
a rear pillar assembly having an upper end, a lower end and a mid-section, the rear pillar structure at least partially defining a rear corner area of a passenger compartment, the rear pillar assembly including an inner panel, an attachment panel and a reinforcement panel, the inner panel having a first upright edge that at least partially defines one side of a rear window opening and a second upright edge that at least partially defines a door opening, the attachment panel being fixedly attached to the inner panel along the mid-section of the rear pillar assembly, an upper edge of the attachment panel at least partially defining a lower portion of the rear window opening, and the reinforcement panel overlaying the mid-section of the inner panel and a portion of the attachment panel, the reinforcement panel further having a curved portion that extends in a vehicle forward direction from the attachment panel along the inner panel, and further curves downward along the inner panel, the curved portion being welded to the mid-section of the inner panel.

2. The vehicle body structure according to claim 1, wherein the reinforcement panel is welded to the mid-section of the inner panel and welded to the attachment panel.

3. The vehicle body structure according to claim 1, wherein
the reinforcement panel includes a lower section, a mid-section, an upper section and the curved portion.

4. The vehicle body structure according to claim 3, wherein
the lower section of the reinforcement panel includes a forward portion that covers and is welded to a corresponding portion of the inner panel, and a rearward portion that overlays a corresponding lower portion of the attachment panel.

5. The vehicle body structure according to claim 4, wherein
the forward portion and the rearward portion are angularly offset from one another by an angle that is between 75 degrees and 100 degrees.

6. The vehicle body structure according to claim 3, wherein the mid-section extends upward from the lower section and has a contoured surface that defines a dimple area with three orthogonal surface sections.

7. The vehicle body structure according to claim 3, wherein
the upper section extends from a surface section of the mid-section and includes a horizontal surface portion located adjacent to the lower portion of the rear window opening.

8. The vehicle body structure according to claim 7, wherein
the curved portion extends in a forward vehicle direction from the upper section of the reinforcement panel, the curved portion having a curved edge that extends defines an upper end of the curved portion and a forward end of the curved portion.

9. The vehicle body structure according to claim 1, wherein the upper end of the rear pillar assembly is attached to a roof structure, and the lower end is attached a floor structure, the rear pillar assembly, the roof structure and the floor structure at least partially defining a passenger compartment.

10. A vehicle body structure, comprising
a roof structure that defines an upper portion of a passenger compartment;
a floor structure that defines a lower portion of the passenger compartment;
a rear pillar assembly having an upper end, a lower end and a mid-section, the rear pillar structure at least partially defining a rear corner area of the passenger compartment, the upper end being attached to the roof structure and the lower end being attached to the floor structure, the rear pillar assembly including an inner panel, an attachment panel and a reinforcement panel, the inner panel having a first upright edge that at least partially defines one side of a rear window opening and a second upright edge that at least partially defines a door opening, the inner panel having an edge that at least partially defines one upright side of a rear window opening, the attachment panel being fixedly attached to the inner panel at a mid-section thereof, an upper edge of the attachment panel at least partially defining a lower portion of the rear window opening, and the attachment panel extending under the rear window opening, the attachment panel being fixedly attached to the inner panel along the mid-section of the rear pillar assembly, an upper edge of the attachment panel at least partially defining a lower portion of the rear window opening, and the reinforcement panel overlaying the mid-section of the inner panel and a portion of the attachment panel, the reinforcement panel further having a curved portion that extends in a vehicle forward direction from the attachment panel along the inner panel, and further curves downward along the inner panel, the curved portion being welded to the mid-section of the inner panel.

11. The vehicle body structure according to claim 10, wherein the reinforcement panel is welded to the mid-section of the inner panel and welded to the attachment panel.

12. The vehicle body structure according to claim 10, wherein
the reinforcement panel includes a lower section, a mid-section, an upper section and the curved portion.

13. The vehicle body structure according to claim 12, wherein
the lower section of the reinforcement panel includes a forward portion that covers and is welded to a corresponding portion of the inner panel, and a rearward portion that overlays a corresponding lower portion of the attachment panel.

14. The vehicle body structure according to claim 13, wherein
the forward portion and the rearward portion are angularly offset from one another by an angle that is between 75 degrees and 100 degrees.

15. The vehicle body structure according to claim 12, wherein
the mid-section extends upward from the lower section and has a contoured surface that defines a dimple area with three orthogonal surface sections.

16. The vehicle body structure according to claim 12, wherein
the upper section extends from a surface section of the mid-section and includes a horizontal surface portion located adjacent to the lower portion of the rear window opening.

17. The vehicle body structure according to claim 16, wherein
the curved portion extends in a forward vehicle direction from the upper section of the reinforcement panel, the curved portion having a curved edge that extends defines an upper end of the curved portion and a forward end of the curved portion.

18. The vehicle body structure according to claim 11, wherein the upper end of the rear pillar assembly is attached to a roof structure, and the lower end is attached a floor structure, the rear pillar assembly, the roof structure and the floor structure at least partially defining a passenger compartment.

* * * * *